A linear low density polyethylene composition suitable for injection molding applications comprising less than or equal to 100 percent by weight of the units derived from ethylene, less than 35 percent by weight of units derived from one or more α-olefin comonomers, and characterized by its density, molecular weight distribution ($M_w/M_n$), a melt index ($I_2$), a molecular weight distribution ($M_z/M_w$), vinyl unsaturation, and zero shear viscosity ratio (ZSVR). The linear low density polyethylene composition exhibits low hexane extractable levels.

6 Claims, No Drawings

POLYOLEFIN COMPOSITIONS AND USES THEREOF

TECHNICAL FIELD

Embodiments of the present disclosure generally relate to polyolefin compositions, and more particularly, to polyolefin compositions suitable for injection molded applications, and uses thereof.

BACKGROUND

The use of polyethylene compositions, such as linear low density polyethylenes and/or high density polyethylenes, in fabrication of injection molded articles is generally known. Any conventional method, such as gas phase process, slurry process, or solution process, may be employed to produce such polyethylene compositions. In addition, any conventional method, such as injection molding process may be employed to produce such injection molded articles.

Despite the research efforts in improving properties of injection molded articles, there is still a need for improving organoleptic properties to impart improved taste and odor properties in food storage devices while minimizing any negative impact on the mechanical properties of such food storage devices and/or process for making thereof.

Accordingly, alternative polyolefin compositions suitable for injection molded applications having improved organoleptic properties with minimal impact to mechanical properties may be desired.

SUMMARY

Disclosed in embodiments herein are linear low density polyethylene compositions suitable for injection molding applications. The compositions comprise less than or equal to 100 percent by weight of the units derived from ethylene, less than 35 percent by weight of units derived from one or more α-olefin comonomers, wherein said linear low density polyethylene composition is characterized by a density in the range of 0.912 to 0.925 g/cm$^3$, a molecular weight distribution ($M_w/M_n$) in the range of 2.5 to 4.5, a melt index ($I_2$) in the range of 15 to 30 g/10 minutes, a molecular weight distribution ($M_z/M_w$) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2.

Also disclosed in embodiments herein are articles for storing items. The articles comprise a container and a lid adapted to be releasably secured to the container. The container and lid are formed from a linear low density polyethylene composition comprising less than or equal to 100 percent by weight of the units derived from ethylene, less than 35 percent by weight of units derived from one or more α-olefin comonomers, wherein said linear low density polyethylene composition is characterized by a density in the range of 0.912 to 0.925 g/cm$^3$, a molecular weight distribution ($M_w/M_n$) in the range of 2.5 to 4.5, a melt index ($I_2$) in the range of 15 to 30 g/10 minutes, a molecular weight distribution (Mz/Mw) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2.

In some embodiments herein, the linear low density polyethylene composition has a density in the range of 0.912 to 0.925 g/cm$^3$, a molecular weight distribution ($M_w/M_n$) in the range of 2.5 to 4.5, a melt index ($I_2$) in the range of 15 to 30 g/10 minutes, a molecular weight distribution ($M_z/M_w$) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2. The linear low density polyethylene composition may be further characterized by having a density in the range of 0.915 to 0.922 g/cm$^3$, and a melt index ($I_2$) in the range of 18 to 28 g/10 minutes.

In embodiments herein, the linear low density polyethylene compositions may have a hexane extractable in the range of from 0.5 to 2 weight percent, based on the weight of the linear low-density polyethylene composition.

Also disclosed in embodiments herein are injection molded articles. The injection molded articles comprise the linear low density polyethylene compositions described herein. The injection molded articles may be a storage device or a closure device.

Additional features and advantages of the embodiments will be set forth in the detail description which follows, and in part will be readily apparent to those skilled in the art from that description or recognized by practicing embodiments described herein, including the detailed description which follows, as well as the claims.

It is to be understood that both the foregoing and the following description describe various embodiments and are intended to provide an overview or framework for understanding the nature and character of the claimed subject matter.

DETAILED DESCRIPTION

Reference will now be made in detail to embodiments of polyolefin compositions and uses thereof. The polyolefin compositions described herein may be suitable for use in injection molding, molding, rotational molding, and blow molding applications, multilayer structures, and articles made therefrom. It should be understood, however, that this merely an illustrative implementation of the compositions disclosed herein. The compositions may be applicable to other technologies that are susceptible to similar problems as those discussed above. For example, the polyolefin compositions may be suitable for use in extrusion coating or extrusion lamination applications.

In embodiments herein, a polyolefin composition is disclosed. The polyolefin composition is a linear low-density polyethylene composition suitable for injection molding applications comprising less than or equal to 100 percent by weight of the units derived from ethylene and less than 35 percent by weight of units derived from one or more α-olefin comonomers. All individual values and subranges are included and disclosed herein.

In some embodiments, the linear low density polyethylene composition may comprise at least 65 percent, at least 70 percent, at least 75 percent, at least 80 percent, at least 85 percent, or at least 90 percent, by weight of units, derived from ethylene. In other embodiments, the linear low density polyethylene composition may comprise 65 percent-99 percent, 70 percent-99 percent, 75 percent-95 percent, or 80 percent-95 percent, by weight of units, derived from ethylene.

In some embodiments, the linear low density polyethylene composition may comprise less than 30 percent, less than 25 percent, less than 20 percent, less than 15 percent, less than 14 percent, by weight of units, derived from one or more α-olefin comonomers. In other embodiments, the linear low density polyethylene composition may comprise 1 percent-35 percent, 1 percent-30 percent, 1 percent-25 percent, 2 percent-20 percent, 2 percent-15 percent, or 5 percent-15 percent, by weight of units, derived from one or more α-olefin comonomers.

The α-olefin comonomers typically have no more than 20 carbon atoms. For example, in some embodiments, the α-olefin comonomers may have 3 to 10 carbon atoms (which may also be denoted as C3-C10) or 3 to 8 carbon atoms (C3-C8). Exemplary α-olefin comonomers may include, but are not limited to, propylene, 1-butene, 1-pentene, 1-hexene, 1-heptene, 1-octene, 1-nonene, 1-decene, and 4-methyl-1-pentene. In some embodiments, the one or more α-olefin comonomers may, for example, be selected from the group consisting of propylene, 1-butene, 1-hexene, and 1-octene; or in the alternative, from the group consisting of 1-hexene and 1-octene.

The ethylene and, optionally, one or more α-olefin comonomers may be (co)polymerized to form the linear low-density polyethylene composition. The terms (co)polymerize, (co)polymerized, (co)polymerization all refer to both polymerization of ethylene and copolymerization of ethylene and one or more α-olefin comonomers.

The linear low density polyethylene composition may further comprise less than or equal to 100 parts by weight of hafnium residues remaining from the hafnium-based metallocene catalyst per one million parts of linear low density polyethylene composition. All individual values and subranges from less than or equal to 100 ppm are included herein and disclosed herein; for example, the linear low density polyethylene composition may further comprise less than or equal to 10 parts by weight of hafnium residues remaining from the hafnium-based metallocene catalyst per one million parts of linear low density polyethylene composition; or in the alternative, the linear low density polyethylene composition may further comprise less than or equal to 8 parts by weight of hafnium residues remaining from the hafnium-based metallocene catalyst per one million parts of linear low density polyethylene composition; or in the alternative, the linear low density polyethylene composition may further comprise less than or equal to 6 parts by weight of hafnium residues remaining from the hafnium-based metallocene catalyst per one million parts of linear low density polyethylene composition; or in the alternative, the linear low density polyethylene composition may further comprise less than or equal to 4 parts by weight of hafnium residues remaining from the hafnium-based metallocene catalyst per one million parts of linear low density polyethylene composition; or in the alternative, the linear low density polyethylene composition may further comprise less than or equal to 2 parts by weight of hafnium residues remaining from the hafnium-based metallocene catalyst per one million parts of linear low density polyethylene composition; or in the alternative, the linear low density polyethylene composition may further comprise less than or equal to 1.5 parts by weight of hafnium residues remaining from the hafnium-based metallocene catalyst per one million parts of linear low density polyethylene composition; or in the alternative, the linear low density polyethylene composition may further comprise less than or equal to 1 parts by weight of hafnium residues remaining from the hafnium-based metallocene catalyst per one million parts of linear low density polyethylene composition; or in the alternative, the linear low density polyethylene composition may further comprise less than or equal to 0.75 parts by weight of hafnium residues remaining from the hafnium-based metallocene catalyst per one million parts of linear low density polyethylene composition; or in the alternative, the linear low density polyethylene composition may further comprise less than or equal to 0.5 parts by weight of hafnium residues remaining from the hafnium-based metallocene catalyst per one million parts of linear low density polyethylene composition the linear low density polyethylene composition may further comprise less than or equal to 0.25 parts by weight of hafnium residues remaining from the hafnium-based metallocene catalyst per one million parts of linear low density polyethylene composition.

The hafnium residues remaining from the hafnium-based metallocene catalyst in the linear low density polyethylene composition may be measured by x-ray fluorescence (XRF), which is calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the linear low density polyethylene composition. In some embodiments, the linear low density polyethylene composition has substantially no chromium, zirconium or titanium content, that is, no or only what would be considered by those skilled in the art as trace amounts of these metals being present, such as, for example, less than 0.001 ppm.

The linear low density polyethylene composition is substantially free of any long chain branching, and, in some embodiments, the linear low density polyethylene composition is free of any long chain branching. Substantially free of any long chain branching, as used herein, refers to a linear low density polyethylene composition substituted with less than about 0.1 long chain branching per 1000 total carbons, and, in some embodiments, less than about 0.01 long chain branching per 1000 total carbons.

The linear low density polyethylene composition may have a density in the range of from 0.912 to 0.925. All individual values and subranges from 0.912 to 0.925 g/cm$^3$ are included herein and disclosed herein; for example, in some embodiments, the density can be in the range of 0.912 to 0.923 g/cm$^3$, or 0.915 to 0.922 g/cm$^3$.

The linear low density polyethylene composition may have a molecular weight distribution ($M_w/M_n$) (measured according to the conventional gel permeation chromatography (GPC) method) in the range of 2.5 to 4.5. All individual values and subranges from 2.5 to 4.5 are included herein and disclosed herein; for example, the molecular weight distribution ($M_w/M_n$) can be from a lower limit of 2.5, 2.7, or 2.9 to an upper limit of 3.2, 3.6, 3.8, 3.9, 4.2, 4.4, or 4.5.

The linear low density polyethylene composition may have a melt index ($I_2$) in the range of from of 15 to 30 g/10 minutes. All individual values and subranges from 15 to 30 g/10 minutes are included herein and disclosed herein. For example, in some embodiments, the melt index ($I_2$) is in the range of 15 to 30 g/10 minutes, 15 to 28 g/10 minutes, or 18 to 28 g/10 minutes.

The linear low density polyethylene composition may have molecular weight distribution ($M_z/M_w$) (measured according to the conventional GPC method) in the range of from 1.9 to 3. All individual values and subranges from 1.9 to 3 are included herein and disclosed herein. For example, in some embodiments, the molecular weight distribution ($M_z/M_w$) (measured according to the conventional GPC method) is in the range of from 1.9 to 2.8, or 1.9-2.5.

The linear low density polyethylene composition may have a vinyl unsaturation of less than 0.1 vinyls per one thousand carbon atoms present in the linear low density polyethylene composition. All individual values and subranges from less than 0.1 are included herein and disclosed herein. For example, in some embodiments, the linear low density polyethylene composition may have a vinyl unsaturation of less than 0.08 vinyls per one thousand carbon atoms present in the linear low density polyethylene composition. In other embodiments, the linear low density polyethylene composition may have a vinyl unsaturation of less than 0.05 vinyls per one thousand carbon atoms present in the linear low density polyethylene composition.

The linear low density polyethylene composition may have a zero shear viscosity ratio (ZSVR) in the range from 1.0 to 1.2. All individual values and subranges from 1.0 to 1.2 are included herein and disclosed herein.

The linear low density polyethylene composition according to the instant invention has a molecular weight ($M_n$) in the range of 8,000 to 25,000 g/mol. All individual values and subranges from 8,000 to 25,000 g/mol are included herein and disclosed herein; for example, the molecular weight ($M_n$) can range from a lower limit of 8,000, 9,000, 10,000, 11,000, or 12,000 g/mol to an upper limit of 23,000, 22,000, 21,000 or 20,000 g/mol.

The linear low density polyethylene composition according to the instant invention has a molecular weight ($M_w$) in the range of 10,000 to 80,000 g/mol. All individual values and subranges from 10,000 to 80,000 g/mol are included herein and disclosed herein; for example, the molecular weight ($M_w$) can be from a lower limit of Mw (lower) 10,000, 20,000, 30,000, or 40,000 g/mol to an upper limit 80,000, 75,000, 70,000, 65,000, 60,000, or 55,000 g/mol.

In embodiments herein the linear low-density polyethylene composition is characterized by a density in the range of 0.912 to 0.925 g/cm$^3$, a molecular weight distribution ($M_w/M_n$) in the range of 2.5 to 4.5, a melt index ($I_2$) in the range of 15 to 30 g/10 minutes, a molecular weight distribution ($M_z/M_w$) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2. In some embodiments, the linear low-density polyethylene composition is characterized by having a density in the range of 0.915 to 0.922 g/cm$^3$, and a melt index ($I_2$) in the range of 18 to 28 g/10 minutes.

In some embodiments, the linear low density polyethylene composition is characterized by having a density in the range of 0.915 to 0.922 g/cm$^3$, a molecular weight distribution (Mw/Mn) in the range of 2.5 to 4.5, a melt index ($I_2$) in the range of 15 to 30 g/10 minutes, a molecular weight distribution (Mz/Mw) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2. In other embodiments, the linear low density polyethylene composition is characterized by having a density in the range of 0.912 to 0.925 g/cm$^3$, a molecular weight distribution ($M_w/M_n$) in the range of 2.5 to 4.5, a melt index ($I_2$) in the range of 18 to 28 g/10 minutes, a molecular weight distribution ($M_z/M_w$) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2. In further embodiments, the linear low density polyethylene composition is characterized by having a density in the range of 0.915 to 0.922 g/cm$^3$, a molecular weight distribution ($M_w/M_n$) in the range of 2.5 to 4.5, a melt index ($I_2$) in the range of 18 to 28 g/10 minutes, a molecular weight distribution ($M_z/M_w$) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2.

Without being bound by theory, it is believed that low hexane extractable levels can lead to improved organoleptic properties, such as, taste. Accordingly, in some embodiments, the linear low-density polyethylene composition has a hexane extractable in the range of from 0.5 to 2 weight percent, based on the weight of the linear low-density composition. In other embodiments, the linear low-density polyethylene composition has a hexane extractable in the range of from 0.5 to 1.5 weight percent, based on the weight of the linear low-density composition.

The linear low density polyethylene composition may further comprise one or more additional additives. Such additives include, but are not limited to, one or more hydrotalcite-based neutralizing agents, antistatic agents, color enhancers, dyes, lubricants, fillers, pigments, primary antioxidants, secondary antioxidants, processing aids, UV stabilizers, nucleators, and combinations thereof.

The linear low density polyethylene composition may comprise from about 0 to about 10 percent by the combined weight of such additives, based on the weight of the linear low density polyethylene composition including such additives. All individual values and subranges from about 0 to about 10 weight percent are included herein and disclosed herein; for example, the linear low density polyethylene composition may comprise from 0 to 7 percent by the combined weight of additives, based on the weight of the linear low density polyethylene composition including such additives; in the alternative, the linear low density polyethylene composition may comprise from 0 to 5 percent by the combined weight of additives, based on the weight of the linear low density polyethylene composition including such additives; or in the alternative, the linear low density polyethylene composition may comprise from 0 to 3 percent by the combined weight of additives, based on the weight of the linear low density polyethylene composition including such additives; or in the alternative, the linear low density polyethylene composition may comprise from 0 to 2 percent by the combined weight of additives, based on the weight of the linear low density polyethylene composition including such additives; or in the alternative, the linear low density polyethylene composition may comprise from 0 to 1 percent by the combined weight of additives, based on the weight of the linear low density polyethylene composition including such additives; or in the alternative, the linear low density polyethylene composition may comprise from 0 to 0.5 percent by the combined weight of additives, based on the weight of the linear low density polyethylene composition including such additives.

Any conventional ethylene (co)polymerization reaction may be employed to produce the linear low density polyethylene compositions described herein. Such conventional ethylene (co)polymerization reactions include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof. For example, the linear low density polyethylene composition may be produced via gas phase polymerization process in a single gas phase reactor; however, the production of the linear low density polyethylene compositions described herein is not limited to gas phase polymerization process, and any of the above polymerization processes may be employed. In some embodiments, the polymerization reactor may comprise of two or more reactors in series, parallel, or combinations thereof. In other embodiments, the polymerization reactor is one reactor, e.g. a fluidized bed gas phase reactor. In another embodiment, the gas phase polymerization reactor is a continuous polymerization reactor comprising one or more feed streams. In the polymerization reactor, the one or more feed streams may be combined together, and the gas comprising ethylene and, optionally, one or more α-olefin comonomers, may be flowed or cycled continuously through the polymerization reactor by any suitable means. The gas comprising ethylene and, optionally, the one or more alpha-olefins, may be fed up through a distributor plate to fluidize the bed in a continuous fluidization process.

In production, a hafnium-based metallocene catalyst system including a cocatalyst as described below in further details, ethylene, one or more optional alpha-olefin comonomers, hydrogen, one or more optional inert gases and/or liquids (e.g. $N_2$, isopentane, and hexane), and, one or more optional continuity additives (e.g. ethoxylated stearyl amine or aluminum distearate or combinations thereof), may be continuously fed into a reactor, e.g. a fluidized bed gas phase reactor. The reactor may be in fluid communication with one or more discharge tanks, surge tanks, purge tanks, and/or recycle compressors. The temperature in the reactor may be in the range of 70° C. to 115° C., 75° C. to 110° C., or 75° C. to 100° C., and the pressure may be in the range of 15 to 30 atm, or 17 to 26 atm. A distributor plate at the bottom of the polymer bed provides a uniform flow of the upflowing monomer, comonomer, and inert gases stream. A mechanical agitator may also be used to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases may be cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the linear low density polyethylene composition is exposed to oxygen. The linear low density polyethylene composition may then be transferred to an extruder to be pelletized. Such pelletization techniques are generally known. The linear low density polyethylene composition may further be melt screened. Subsequent to the melting process in the extruder, the molten composition may be passed through one or more active screens, positioned in series of more than one, with each active screen having a micron retention size of from about 2 μm to about 400 μm (2 to $4 \times 10^{-5}$ m), from about 2 μm to about 300 μm (2 to $3 \times 10^{-5}$ m), or from about 2 μm to about 70 μm (2 to $7 \times 10^{-6}$ m), at a mass flux of about 5 to about 100 lb/hr/in$^2$ (1.0 to about 20 kg/s/m$^2$). Melt screening is disclosed, for example, in U.S. Pat. No. 6,485,662, which is incorporated herein by reference to the extent that it discloses melt screening.

In some embodiments, the linear low density polyethylene composition is made using a fluidized bed reactor. A monomer stream is passed to a polymerization section. The fluidized bed reactor may include a reaction zone in fluid communication with a velocity reduction zone. The reaction zone includes a bed of growing polymer particles, formed polymer particles, and catalyst composition particles fluidized by the continuous flow of polymerizable and modifying gaseous components in the form of make-up feed and recycle fluid through the reaction zone. In some embodiments, the make-up feed includes polymerizable monomer, ethylene and one or more optional α-olefin comonomers, and may also include condensing agents as is known in the art and disclosed in, for example, U.S. Pat. No. 4,543,399, U.S. Pat. No. 5,405,922, and U.S. Pat. No. 5,462,999.

The fluidized bed may have the general appearance of a dense mass of individually moving particles, such as, polyethylene particles, as generated by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. In some embodiments, the superficial gas velocity is at least two times the minimum flow velocity. In other embodiments, the superficial gas velocity does not exceed 1.5 msec and usually no more than 0.76 ft/sec is sufficient.

The height to diameter ratio of the reaction zone can vary in the range of about 2:1 to about 5:1. The range, of course, can vary to larger or smaller ratios depending upon the desired production capacity. The cross-sectional area of the velocity reduction zone is typically within the range of about 2 to about 3 multiplied by the cross-sectional area of the reaction zone.

The velocity reduction zone can have a larger inner diameter than the reaction zone, and be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. The gas exiting the overhead of the reactor is the recycle gas stream.

The recycle stream may be compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

In some embodiments, the recycle stream is returned to the reactor and to the fluidized bed through a gas distributor plate. A gas deflector may be installed at the inlet to the reactor to prevent contained polymer particles from settling out and agglomerating into a solid mass and to prevent liquid accumulation at the bottom of the reactor as well to facilitate easy transitions between processes that contain liquid in the cycle gas stream and those that do not, and vice versa. Such deflectors are described in the U.S. Pat. No. 4,933,149 and U.S. Pat. No. 6,627,713.

The hafnium-based catalyst system used in the fluidized bed may be stored for service in a reservoir under a blanket of a gas that is inert to the stored material, such as, nitrogen or argon. The hafnium-based catalyst system may be added to the reaction system, or reactor, at any point and by any suitable means, and, in some embodiments, is added to the reaction system either directly into the fluidized bed or downstream of the last heat exchanger, i.e. the exchanger farthest downstream relative to the flow, in the recycle line, in which case the activator is fed into the bed or recycle line from a dispenser. The hafnium-based catalyst system is injected into the bed at a point above distributor plate. In some embodiments, the hafnium-based catalyst system is injected at a point in the bed where good mixing with polymer particles can occur. Injecting the hafnium-based catalyst system at a point above the distribution plate facilitates the operation of a fluidized bed polymerization reactor.

The ethylene and alpha-olefin monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. In some embodiments, the gas analyzer is positioned to receive gas from a sampling point located between the velocity reduction zone and heat exchanger.

The production rate of the linear low density polyethylene composition may be controlled by adjusting the rate of catalyst composition injection, activator injection, or both. Since any change in the rate of catalyst composition injection will change the reaction rate and thus the rate at which heat is generated in the bed, the temperature of the recycle stream entering the reactor can be adjusted to accommodate any change in the rate of heat generation. This may ensure the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed can be maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of linear low density polyethylene composition formation at a constant fluid velocity if no or negligible vaporizable liquid is present in the inlet fluid.

On discharge of particulate polymer product from reactor, the fluid may be separated from the product so that the fluid may be returned to the recycle line. There are numerous ways known to the art to accomplish this separation. Product discharge systems which may be alternatively employed are disclosed and claimed in U.S. Pat. No. 4,621,952. Such a system can employ at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C., 75° C., or 80° C. to 90° C., 95° C., 100° C., 110° C., or 115° C., wherein a desirable temperature range comprises any upper temperature limit combined with any lower temperature limit described herein. In general, the reactor temperature is operated at the highest temperature that is feasible, taking into account the sintering temperature of the inventive linear low density polyethylene composition within the reactor and fouling that may occur in the reactor or in the recycle line(s).

The above described process information is suitable for the production of homopolymers comprising ethylene-derived units, or copolymers comprising ethylene-derived units and at least one or more other α-olefin(s)-derived units.

In order to maintain an adequate catalyst productivity, the ethylene may be present in the reactor at a partial pressure at or greater than 160 psia (1100 kPa), 190 psia (1300 kPa), 200 psia (1380 kPa), 210 psia (1450 kPa), or 220 psia (1515 kPa).

The one or more α-olefin comonomers, if present in the polymerization reactor, may be present at any level that will achieve the desired weight percent incorporation of the comonomer into the finished polyethylene. This is expressed as a mole ratio of comonomer to ethylene as described herein, which is the ratio of the gas concentration of comonomer moles in the cycle gas to the gas concentration of ethylene moles in the cycle gas. In some embodiments of the linear low density polyethylene composition production, the comonomer is present with ethylene in the cycle gas in a mole ratio range of from 0 to 0.1 (comonomer:ethylene); from 0 to 0.05 in another embodiment; from 0 to 0.04 in another embodiment; from 0 to 0.03 in another embodiment; and from 0 to 0.02 in another embodiment.

Hydrogen gas may also be added to the polymerization reactor(s) to control the final properties (e.g., $I_{21}$ and/or $I_2$) of the linear low density polyethylene composition. In some embodiments, the ratio of hydrogen to total ethylene monomer (ppm $H_2$/mol. % $C_2$) in the circulating gas stream is in a range of from 0 to 60:1; from 0.10:1 (0.10) to 50:1 (50) in another embodiment; from 0 to 35:1 (35) in another embodiment; from 0 to 25:1 (25) in another embodiment; and from 7:1 (7) to 22:1 (22) in another embodiment.

In some embodiments, the process for producing a linear low density polyethylene composition comprises: (1) (co)polymerizing ethylene and, optionally, one or more α-olefin comonomer in the presence of a hafnium-based metallocene catalyst via a gas phase (co)polymerization process in a single stage reactor; and (2) thereby producing the linear low density polyethylene composition.

The hafnium-based catalyst system, as used herein, refers to a catalyst capable of catalyzing the polymerization of ethylene monomers and, optionally, one or more α-olefin co monomers to produce polyethylene. Furthermore, the hafnium-based catalyst system comprises a hafnocene component. The hafnocene component may comprise mono-, bis- or tris-cyclopentadienyl-type complexes of hafnium. In some embodiments, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind") and substituted versions thereof. In some embodiments, the hafnocene component is an unbridged bis-cyclopentadienyl hafnocene and substituted versions thereof. In other embodiments, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. The hafnocene useful in the present invention can be represented by the formula (where "Hf" is hafnium):

$$Cp_nHfX_p \quad (1)$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silyl-hydrocarbons, and siloxyl-hydrocarbons.

An example of $C_1$ to $C_5$ alkylenes include ethylene (—$CH_2CH_2$—) bridge groups; an example of an alkylamine bridging group includes methylamide (—($CH_3$)N—); an example of a silyl-hydrocarbon bridging group includes dimethylsilyl (—($CH_3$)$_2$Si—); and an example of a siloxyl-hydrocarbon bridging group includes (—O—($CH_3$)$_2$Si—O—). In some embodiments, the hafnocene component is represented by formula (1), wherein n is 2 and p is 1 or 2.

As used herein, the term "substituted" means that the referenced group possesses at least one moiety in place of one or more hydrogens in any position, the moieties selected from such groups as halogen radicals, such as F, Cl, Br, hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

In some embodiments, the hafnocene component useful in the present invention can be represented by the formula:

$$(CpR_5)_2HfX_2 \quad (2)$$

wherein each Cp is a cyclopentadienyl ligand and each is bound to the hafnium; each R is independently selected from hydrides and $C_1$ to $C_{10}$ alkyls or from hydrides and $C_1$ to $C_5$ alkyls; and X is selected from the group consisting of hydride, halide, $C_1$ to $C_{10}$ alkyls and $C_2$ to $C_{12}$ alkenyls, from the group consisting of halides, $C_2$ to $C_6$ alkylenes and $C_1$ to $C_6$ alkyls, or from the group consisting of chloride, fluoride, $C_1$ to $C_5$ alkyls and $C_2$ to $C_6$ alkylenes. In other embodiments, the hafnocene is represented by formula (2) above, wherein at least one R group is an alkyl as defined above, or a $C_1$ to $C_5$ alkyl, and the other R groups are hydrides. In further embodiments, each Cp is independently substituted with from one-three groups selected from the group consisting of methyl, ethyl, propyl, butyl, and isomers thereof.

The hafnocene-based catalyst system may be heterogeneous, i.e. the hafnocene-based catalyst may further comprise a support material. The support material can be any material known in the art for supporting catalyst compositions, such as, for example an inorganic oxide, or, in the alternative, silica, alumina, silica-alumina, magnesium chloride, graphite, magnesia, titania, zirconia, and montmorillonite, any of which can be chemically/physically modified, such as, by fluoriding processes, calcining processes, or other processes known in the art. In some embodiments, the support material is a silica material having an average particle size as determined by Malvern analysis of from 1 to 60 mm or, in the alternative, 10 to 40 mm.

The hafnium-based catalyst system may further comprise an activator. Any suitable activator known to activate catalyst components towards olefin polymerization may be suitable. In some embodiments, the activator is an alumoxane, or, in the alternative, a methalumoxane such as those described by J. B. P. Soares and A. E. Hamielec in 3(2) POLYMER REACTION ENGINEERING 131 200 (1995). The alumoxane may be co-supported on the support material in a molar ratio of aluminum to hafnium (Al:Hf) ranging from 80:1 to 200:1, or 90:1 to 140:1. Hafnium-based catalyst systems are further described in U.S. Pat. No. 6,242,545 and U.S. Pat. No. 7,078,467, which is incorporated herein by reference.

End-Use Applications

The linear low-density polyethylene compositions described herein can be used to prepare durable parts or articles with known polymer processes such as extrusion (e.g., sheet extrusion and profile extrusion), injection molding, molding, rotational molding, and blow molding. In some embodiments, the linear low density polyethylene compositions are used to prepare an injection molded article. The injection molded article may be a storage device or a closure device, in other embodiments, the linear low density polyethylene compositions are used to prepare an article for storing items. The article may be a container and a lid adapted to be releasably secured to the container.

In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Elsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, Which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques, Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials &Processing,*" Hanser Gardner Publications, Cincinnati, Ohio (1998), which is incorporated herein by reference in its entirety.

Blow molding can be used for making hollow plastics containers. The process includes placing a softened polymer in the center of a mold, inflating the polymer against the mold walls, with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding,*" Hanser Gardner Publications, Cincinnati, Ohio (2000), which is incorporated herein by reference in its entirety.

Test Methods

Unless otherwise stated, the following test methods are used.

Melt Index

Melt indices ($I_2$ and $I_{21}$) are measured in accordance to ASTM D-1238 at 190° C. and at 2.16 kg and 21.6 kg load, respectively. The values are reported in g/10 min.

Density

Samples for density measurement are prepared according to ASTM D4703. Measurements are made within one hour of sample pressing using ASTM D792, Method B.

Dynamic Shear Rheology

Samples are compression-molded into 3 mm thick×25 mm diameter circular plaques at 177° C. for 5 minutes under 10 MPa pressure in air. The sample is then taken out of the press and placed on the counter to cool.

Constant temperature frequency sweep measurements are performed on an ARES strain controlled rheometer (TA Instruments) equipped with 25 mm parallel plates, under a nitrogen purge. For each measurement, the rheometer is thermally equilibrated for at least 30 minutes prior to zeroing the gap. The sample is placed on the plate and allowed to melt for five minutes at 190° C. The plates are then closed to 2 mm, the sample trimmed, and then the test is started. The method has an additional five minute delay built in, to allow for temperature equilibrium. The experiments are performed at 190° C. over a frequency range of 0.1-100 rad/s at five points per decade interval. The strain amplitude is constant at 10%. The stress response is analyzed in terms of amplitude and phase, from which the storage modulus (G'), loss modulus (G"), complex modulus (G*), dynamic viscosity (η*), and tan (δ) or tan delta are calculated.

High Temperature Gel Permeation Chromatography

The Gel Permeation Chromatography (GPC) system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer Char (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used, such as, four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci.*, Polym. Letters, 6, 621 (1968)):

$$M_{polyethylene} = A \times (M_{polystyrene})^B.$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as, the molecular weight distribution (MWD or $M_w/M_n$), and related statistics (generally refers to conventional GPC or cc-GPC results), is defined here as the modified method of Williams and Ward.

Creep Zero Shear Viscosity Measurement Method

Zero-shear viscosities can be obtained via creep tests that are conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ϵ vs. t, where ϵ is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M., Jr., Huang, Joe W. L., Reichek, Kenneth N, "Detection of low levels of long-chain branching in polyolefins," Annual Technical Conference-Society of Plastics Engineers (2008), 66$^{th}$, 887-891.

Vinyl Unsaturation

Vinyl unsaturation level is determined by a FT-IR (Nicolet 6700) in accordance with ASTM D6248-98.

Hexane Extractables

Hexane extractables are measured according to FDA protocol with one deviation of using hexanes instead of n-hexane. Pellets are pressed into film with a Carver Press at a thickness of 3.0-4.0 mils. Non-residue gloves are worn so as to not contaminate films with residual oils from the hands of the operator. Films are cut into 1×1 inch squares and weighed (2.5±0.05 g). The films are then extracted for 2 hours in a 49.5±0.5° C. hexane vessel heated in a water bath. After 2 hours, the films are removed, rinsed in clean hexane, and dried in a vacuum oven (80±5° C.) at full vacuum for two hours. The films are then placed in a desiccator and allowed to cool to room temperature for a minimum of one hour. The films are then reweighed and the amount of mass loss due to extraction of hexane is calculated.

Tensile Strength is measured in accordance with ASTM D6389.

Charpy Impact is measured in accordance with ISO 179 at 0° F.

Gardner Impact is measured in accordance at ASTM D5420 at 0° F.

Environmental Stress Crack Resistance-Notch Constant Ligament Stress (ESCR-NCLS) is measured in accordance with ASTM F2136.

EXAMPLES

The embodiments described herein may be further illustrated by the following non-limiting examples.

Inventive Compositions 1-4

Inventive Composition 1 comprises 100 percent by weight of a linear low density polyethylene (LLDPE1), which is an ethylene(C2)-hexene(C6) interpolymer, having a density of approximately 0.918 g/cm$^3$, a melt index (I$_2$), measured at 190° C. and 2.16 kg, of approximately 21.9 g/10 minutes, a melt flow ratio (I$_{21}$/I$_2$) of approximately 27.5. Additional properties of LLDPE-1 are measured and reported in Table 1.

Inventive Composition 2 comprises 100 percent by weight of a linear low density polyethylene (LLDPE2), which is an ethylene(C2)-hexene(C6) interpolymer, having a density of approximately 0.916 g/cm$^3$, a melt index (I$_2$), measured at 190° C. and 2.16 kg, of approximately 20.3 g/10 minutes, a melt flow ratio (I$_{21}$/I$_2$) of approximately 27.3. Additional properties of LLDPE-2 are measured and reported in Table 1.

Inventive Composition 3 comprises 100 percent by weight of a linear low density polyethylene (LLDPE1), which is an ethylene(C2)-hexene(C6) interpolymer, having a density of approximately 0.914 g/cm$^3$, a melt index (I$_2$), measured at 190° C. and 2.16 kg, of approximately 16.8 g/10 minutes, a melt flow ratio (I$_{21}$/I$_2$) of approximately 26.4. Additional properties of LLDPE-3 are measured and reported in Table 1.

Inventive Composition 4 comprises 100 percent by weight of a linear low density polyethylene (LLDPE4), which is an ethylene(C2)-hexene(C6) interpolymer, having a density of approximately 0.915 g/cm$^3$, a melt index (I$_2$), measured at 190° C. and 2.16 kg, of approximately 17.3 g/10 minutes, a melt flow ratio (I$_{21}$/I$_2$) of approximately 21.65. Additional properties of LLDPE-4 are measured and reported in Table 1.

LLDPE1-LLDPE4 are prepared via gas-phase polymerization in a single fluidized bed reactor system according to the polymerization conditions reported in Table 2 in the presence of a hafnium-based catalyst system, as described above, represented by the following structure:

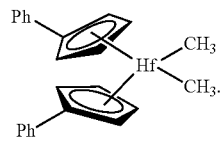

Comparative Composition A

Comparative Composition A (commercially available under the trade name DOWLEX™ 2517 from The Dow Chemical Company) comprises 100 percent by weight of a comparative linear low density polyethylene (LLDPE-A), which is an ethylene-octene interpolymer, having a density of approximately 0.919 g/cm$^3$, a melt index (I$_2$), measured at 190° C. and 2.16 kg, of approximately 24.3 g/10 minutes, a melt flow ratio (I$_{21}$/I$_2$) of approximately 22.8. Additional properties of LLDPE-A are measured and reported in Table 1.

Inventive Injection Molded Articles 1

Inventive Injection Molded Articles 1-4 (IIMA 1-4) are plaques that were prepared via injection molding process using inventive compositions 1-4 on Husky Injection Molding Machine (225 ton, 2 stage injection, 8.5 oz.) according to the process conditions reported in Table 3. The properties of the IIMA 1-4 are measured and reported in Table 4.

Comparative Injection Molded Article 1

Comparative Injection Molded Article 1 (CIMA 1) is a plaque that was prepared via injection molding process using comparative composition A on Husky Injection Molding Machine (225 ton, 2 stage injection, 8.5 oz.) according to the process conditions reported in Table 3. The properties of the CIMA 1 are measured and reported in Table 4.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

TABLE 1

|  | Unit | LLDPE 1 | LLDPE 2 | LLDPE 3 | LLDPE 4 | LLDPE A |
|---|---|---|---|---|---|---|
| Density |  | 0.919 | 0.916 | 0.914 | 0.915 | 0.919 |
| I2 | g/10 min | 21.9 | 20.3 | 16.8 | 17.3 | 24.3 |
| I21 | g/10 min | 602 | 553 | 444 | 375 | 555 |
| I21/I2 |  | 27.5 | 27.3 | 26.4 | 21.6 | 22.8 |
| Mn | g/mol | 13,635 | 17,349 | 15,361 | 19,296 | 13,773 |
| Mw | g/mol | 49,511 | 51,412 | 53,542 | 52,526 | 47,136 |
| Mz | g/mol | 113,509 | 110,326 | 118,271 | 103,840 | 104,496 |
| Mw/Mn |  | 3.63 | 2.96 | 3.49 | 2.72 | 3.42 |
| Mz/Mw |  | 2.29 | 2.15 | 2.21 | 1.98 | 2.22 |
| Eta* (0.1 rad/s) | Pa·s | 338 | 346 | 446 | 398 | 340 |
| Eta* (1 rad/s) | Pa·s | 337 | 347 | 446 | 401 | 344 |
| Eta* (10 rad/s) | Pa·s | 319 | 330 | 420 | 386 | 313 |
| Eta* (100 rad/s) | Pa·s | 233 | 244 | 299 | 298 | 228 |
| Eta* (0.1/100) |  | 1.45 | 1.42 | 1.49 | 1.33 | 1.49 |
| Hexane extractable | wt. % | 1.06 | 1.22 | 1.21 | 0.93 | 2.39 |
| ZSVR |  | 1.16 | 1.06 | 1.11 | 1.11 | 1.56 |
| Vinyl Unsaturation |  | 0.028 | 0.031 | 0.017 | 0.023 | 0.303 |

TABLE 2

|  | LLDPE 1 | LLDPE 2 | LLDPE 3 | LLDPE 4 |
|---|---|---|---|---|
| Reactor Pressure (psig) | 348 | 348 | 248 | 348 |
| Bed Temperature (° C.) | 75 | 75 | 75 | 81 |
| C2 Partial Pressure (psia) | 190 | 190 | 190 | 160 |
| C6/C2 Molar Ratio | 0.015 | 0.015 | 0.016 | 0.014 |
| C6/C2 Flow Ratio | 0.095 | 0.105 | 0.109 | 0.099 |
| H2 ppm/C2 mol % | 15.4 | 16.4 | 16.0 | 15.8 |
| H2 ppm | 804 | 859 | 842 | 697 |
| Isopentane (mol %) | 5.0 | 5.0 | 5.0 | 5.0 |
| Reactor Residence Time (hr) | 2.67 | 2.53 | 2.49 | 2.38 |

TABLE 3

| Description | Unit | Value |
|---|---|---|
| Cycle Time | Seconds | 20 |
| Melt Temperature | degrees C. | 235 |
| Injection Time | Seconds | 0.5 |
| Injection Pressure | psi | 1550 |

TABLE 4

| | | Injection Molded Plaques* | | | | |
|---|---|---|---|---|---|---|
|  | Unit | IIMA 1 | IIMA 2 | IIMA 3 | IIMA 4 | CIMA 1 |
| Tensile Strength at Break | psi | 2,031 | 3,366 | 4,118 | 3,861 | 2,025 |
| Tensile Strength at Yield | psi | 1,127 | 1,146 | 1,075 | 1,143 | 1,291 |
| Charpy Impact; 0° F. | in-lb/inch | 14.0 | 14.5 | 12.7 | 11.7 | 12.9 |
| Gardner Impact, 0° F. | in-lb/inch | 40.2 | 51.8 | 54.4 | 50.0 | 34.8 |
| ESCR-NCLS | hrs. | 22.0 | 73.4 | 309 | 50.9 | 0.54 |

*Husky SX225-P, 225 metric ton, Plaque: 5.95" × 5.95" × 0.040" (length × width × thickness).

Every document cited herein, if any, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. An injection molded article comprising a linear low density polyethylene composition comprising:
   less than or equal to 100 percent by weight of the units derived from ethylene;
   less than 35 percent by weight of units derived from one or more α-olefin comonomers;
   wherein said linear low density polyethylene composition has a density in the range of 0.912 to 0.925 g/cm³, a molecular weight distribution ($M_w/M_n$) in the range of 2.5 to 4.5, a melt index ($I_2$) in the range of 15 to 30 g/10 minutes, a molecular weight distribution ($M_z/M_w$) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2.

2. The composition of claim 1, wherein said linear low density polyethylene composition is characterized by having a density in the range of 0.915 to 0.922 g/cm$^3$, and a melt index (I$_2$) in the range of 18 to 28 g/10 minutes.

3. The composition of claim 1, wherein said linear low-density polyethylene composition has a hexane extractable in the range of from 0.5 to 2 weight percent, based on the weight of the linear low-density polyethylene composition.

4. The injection molded article claim 1, wherein said injection molded article is a container device.

5. The injection molded article claim 1, wherein said injection molded article is a closure device.

6. An article for storing items comprising a container and a lid adapted to be releasably secured to the container, wherein the container and lid are formed from a linear low density polyethylene composition comprising:

- less than or equal to 100 percent by weight of the units derived from ethylene;
- less than 35 percent by weight of units derived from one or more α-olefin comonomers;
- wherein said linear low density polyethylene composition has a density in the range of 0.912 to 0.925 g/cm$^3$, a molecular weight distribution ($M_w/M_n$) in the range of 2.5 to 4.5, a melt index (I$_2$) in the range of 15 to 30 g/10 minutes, a molecular weight distribution ($M_z/M_w$) in the range of from 1.9 to 3, vinyl unsaturation of less than 0.1 vinyls per one thousand carbon atoms present in the backbone of said composition, and a zero shear viscosity ratio (ZSVR) in the range from 1 to 1.2.

* * * * *